US012304991B2

(12) United States Patent
Turpen et al.

(10) Patent No.: US 12,304,991 B2
(45) Date of Patent: May 20, 2025

(54) PHOTOCHROMIC ARTICLE

(71) Applicant: Transitions Optical, Ltd., Tuam (IE)

(72) Inventors: Joseph D. Turpen, Tuam (IE);
Elizabeth A. Zezinka, Cranberry Township, PA (US); Emily Amond, Allison Park, PA (US); Anu Chopra, Pittsburgh, PA (US); Michael Frank Haley, Glenshaw, PA (US); Beon-Kyu Kim, Gibsonia, PA (US); Sujit Mondal, Gibsonia, PA (US); Nicholas J. Parise, Pittsburgh, PA (US); Brian Shaughnessy, Kilmaine (IE); Robert W. Walters, Murrysville, PA (US); Wenjing Xiao, Murrysville, PA (US); An-Hung Yeh, Mars, PA (US)

(73) Assignee: Transitions Optical, Ltd., Tuam (IE)

( * ) Notice: Subject to any disclaimer, the term of this patent is extended or adjusted under 35 U.S.C. 154(b) by 769 days.

(21) Appl. No.: 17/292,055

(22) PCT Filed: Nov. 7, 2019

(86) PCT No.: PCT/EP2019/080500
§ 371 (c)(1),
(2) Date: May 7, 2021

(87) PCT Pub. No.: WO2020/094772
PCT Pub. Date: May 14, 2020

(65) Prior Publication Data
US 2021/0395436 A1 Dec. 23, 2021

Related U.S. Application Data

(60) Provisional application No. 62/757,454, filed on Nov. 8, 2018.

(51) Int. Cl.
*C08G 18/10* (2006.01)
*C08G 18/44* (2006.01)
*G02B 1/04* (2006.01)
*G02B 5/23* (2006.01)
*G03C 1/73* (2006.01)

(52) U.S. Cl.
CPC ............ *C08G 18/44* (2013.01); *C08G 18/10* (2013.01); *G02B 1/041* (2013.01); *G02B 5/23* (2013.01); *G03C 1/73* (2013.01)

(58) Field of Classification Search
CPC ........ C08G 18/10; C08G 18/44; G02B 1/041; G02B 5/23; G03C 1/73
See application file for complete search history.

(56) References Cited

U.S. PATENT DOCUMENTS

| 5,658,501 A | 8/1997 | Kumar et al. |
| 5,962,617 A | 10/1999 | Slagel |
| 7,410,691 B2 | 8/2008 | Blackburn et al. |
| 7,527,754 B2 | 5/2009 | Chopra |
| 8,388,872 B2 | 3/2013 | Chopra et al. |
| 8,518,305 B2 | 8/2013 | Tomasulo |
| 8,608,988 B2 | 12/2013 | Bowles et al. |
| 8,748,634 B2 | 6/2014 | Chopra et al. |
| 9,683,102 B2 | 6/2017 | Cefalo et al. |
| 10,954,397 B2 | 3/2021 | Haley et al. |
| 2006/0228557 A1 | 10/2006 | Kim et al. |
| 2007/0138448 A1* | 6/2007 | Chopra ............... G03C 1/73 252/582 |
| 2011/0108781 A1* | 5/2011 | Tomasulo ............ C09K 9/02 546/14 |
| 2012/0145973 A1* | 6/2012 | Bancroft ............. C09K 9/02 544/150 |
| 2012/0212840 A1 | 8/2012 | Bowles et al. |
| 2015/0234678 A1 | 8/2015 | De Ayguavives et al. |
| 2016/0279886 A1 | 9/2016 | Lynch et al. |
| 2018/0208781 A1* | 7/2018 | Haley ............... C08G 18/44 |

FOREIGN PATENT DOCUMENTS

| CN | 101341141 A | 1/2009 |
| CN | 102667621 A | 9/2012 |
| EP | 1872173 B9 | 4/2010 |
| WO | 2017030545 A1 | 2/2017 |

* cited by examiner

*Primary Examiner* — Bijan Ahvazi
(74) *Attorney, Agent, or Firm* — The Webb Law Firm

(57) ABSTRACT

The present invention relates to a photochromic article that includes a substrate and a photochromic layer formed from a curable photochromic composition. The photochromic composition includes a polyol component that includes a polycarbonate diol, an isocyanate component that includes an unblocked polyfunctional isocyanate and/or a blocked polyfunctional isocyanate, and at least one photochromic compound. The equivalents ratio of blocked/unblocked isocyanate equivalents of the isocyanate component to hydroxyl equivalents of the polyol component is at least 5:1. The photochromic article exhibits a $T_{1/2}$ (Fade Half Life) at 23° C. of less than or equal to 70 seconds.

13 Claims, No Drawings

PHOTOCHROMIC ARTICLE

CROSS-REFERENCE TO RELATED APPLICATIONS

This application is the United States national phase of International Application No. PCT/EP2019/080500 filed Nov. 7. 2019, and claims priority to U.S. patent application Ser. No. 62/757,454, filed Nov. 8, 2018, the disclosures of which are hereby incorporated by reference in their entirety.

FIELD OF THE INVENTION

The present invention relates to a photochromic article that includes a substrate and a photochromic layer formed from a curable photochromic composition, which includes a polyol component that includes a polycarbonate diol, an isocyanate component, and at least one photochromic compound, in which the equivalents ratio of blocked/unblocked isocyanate to hydroxyl is at least 5:1, and the photochromic article exhibits a $T_{1/2}$ (Fade Half Life) at 23° C. of less than or equal to 70 seconds.

BACKGROUND OF THE INVENTION

In response to certain wavelengths of electromagnetic radiation (or "actinic radiation"), photochromic compounds typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached/substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached/colorless) state. Compositions, such as curable compositions, that contain photochromic compounds typically display colorless (such as clear) and colored states that correspond to the colorless and colored states of the photochromic compounds contained therein.

Photochromic compounds can be used in curable compositions to form, for example, cured layers, such as cured films or sheets that are photochromic. With cured photochromic layers, such as cured photochromic coatings, it is typically desirable that they provide a combination of hardness and photochromic performance. Generally, the kinetics associated with the reversible transformation of a photochromic compound between a closed-form (unactivated/colorless) and an open-form (activated/colored) is faster in a soft matrix, but slower in a hard matrix (of the cured layer in which the photochromic compound resides). Cured photochromic layers having a soft matrix typically have reduced hardness, while those having a hard matrix typically have increased hardness.

It would be desirable to develop photochromic articles that include a photochromic layer that is formed from a curable photochromic composition that provides a cured photochromic layer having a combination of improved photochromic performance, without a reduction in hardness of the photochromic layer.

SUMMARY OF THE INVENTION

In accordance with the present invention, there is provided a photochromic article comprising (A) a substrate; and (B) a photochromic layer residing over at least a portion of the substrate, in which the photochromic layer is formed from a curable photochromic composition. The curable photochromic composition comprises (a) a polyol component, in which the polyol component comprises a polycarbonate diol having a hydroxyl equivalent weight of at least 1300. The curable photochromic composition further comprises (b) an isocyanate component comprising at least one of an unblocked polyfunctional isocyanate comprising at least two unblocked isocyanate groups, a blocked polyfunctional isocyanate comprising at least two blocked isocyanate groups, or combinations of the unblocked polyfunctional isocyanate and the blocked polyfunctional isocyanate. The curable photochromic composition also comprises (c) at least one photochromic compound. The photochromic composition has an equivalents ratio of (i) unblocked isocyanate equivalents and blocked isocyanate equivalents of the isocyanate component to (ii) hydroxyl equivalents of the polyol component, that is at least 5:1. The photochromic article exhibits a $T_{1/2}$ (Fade Half Life) at 23° C. of less than or equal to 70 seconds.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION OF THE INVENTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. As used herein, the term "(meth) acrylic acid" means methacrylic acid and/or acrylic acid.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another, as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state (e.g., discontinuing exposure to such actinic radiation).

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, photochromic compounds of the photochromic layer of the photochromic articles of the present invention can have a different absorption spectrum in each of the first and second state. For example, while not limiting herein, a photochromic compound can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including, without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the term "polyol" means a material having at least two hydroxyl groups.

All documents, such as, but not limited to, issued patents and patent applications, referred to herein, and unless otherwise indicated, are to be considered to be "incorporated by reference" in their entirety.

As used herein, the term "aliphatic" and related terms, such as "aliphatic group(s)", means non-cyclic and non-aromatic hydrocarbon groups, which include at least one carbon atom, such as 1 to 20 carbon atoms, such as $C_1$-$C_{20}$ aliphatic groups, or $C_1$-$C_{10}$ aliphatic groups, or $C_1$-$C_6$ aliphatic groups; can be linear or branched; optionally include one or more interior and/or terminal alkene (or alkenyl) groups; and optionally include one or more interior and/or terminal alkyne (or alkynyl) groups. When including two or more alkene groups, the alkene groups of an aliphatic group can be conjugated and/or non-conjugated. When including two or more alkyne groups, the alkyne groups of an aliphatic group can be conjugated and/or non-conjugated. When including at least one alkene group and at least one alkyne group, the alkene and alkyne groups of the aliphatic group can be conjugated and/or non-conjugated relative to each other.

Examples of aliphatic groups include, but are not limited to, alkyl groups. As used herein, the term "alkyl" and related terms, such as "alkyl group(s)", means groups which include at least one carbon atom, such as 1 to 20 carbon atoms, such as $C_1$-$C_{20}$ alkyl groups, or $C_1$-$C_{10}$ alkyl groups, or $C_1$-$C_6$ alkyl groups; are linear or branched; and are saturated (and correspondingly are free of alkene groups and alkyne groups). Examples of alkyl groups include, but are not limited to, methyl, ethyl, n-propyl, iso-propyl, n-butyl, iso-butyl, sec-butyl, t-butyl, linear or branched pentyl, linear or branched hexyl, linear or branched heptyl, linear or branched octyl, linear or branched nonyl, linear or branched decyl, linear or branched undecyl, linear or branched dodecyl, linear or branched tridecyl, linear or branched tetradecyl, linear or branched pentadecyl, linear or branched hexadecyl, linear or branched heptadecyl, linear or branched octadecyl, linear or branched nonadecyl, and linear or branched eicosanyl.

As used herein, recitations of "linear or branched" groups, such as but not limited to linear or branched alkyl, are herein understood to include, for purposes of non-limiting illustration, a methylene group or a methyl group; groups that are linear, such as linear $C_2$-$C_{20}$ alkyl groups; and groups that are appropriately branched, such as, but not limited to, branched $C_3$-$C_{20}$ alkyl groups.

Examples of aliphatic groups include, but are not limited to, alkenyl groups. As used herein, the term "alkenyl" and related terms, such as "alkenyl groups", means groups which include at least two carbon atoms, such as 2 to 20 carbon atoms, such as $C_2$-$C_{20}$ alkenyl groups, or $C_2$-$C_{10}$ alkenyl groups, or $C_2$-$C_6$ alkenyl groups; are linear or branched; and include one or more interior and/or terminal alkene (or alkenyl) groups. Examples of alkenyl groups include, but are not limited to, those examples of linear or branched alkyl groups recited previously herein, which have at least two carbon atoms and at least one alkene (or alkenyl) group, such as, but not limited to, ethenyl, linear or branched propenyl, linear or branched butenyl, linear or branched pentenyl, linear or branched hexenyl, etc.

Examples of aliphatic groups include, but are not limited to, alkynyl groups. As used herein, the term "alkynyl" and related terms, such as "alkynyl group(s)" means groups which include at least two carbon atoms, such as 2 to 20 carbon atoms, such as $C_2$-$C_{20}$ alkynyl groups, or $C_2$-$C_{10}$ alkynyl groups, or $C_2$-$C_6$ alkynyl groups; are linear or branched; and include one or more interior and/or terminal alkyne (or alkynyl) groups. Examples of alkynyl groups include, but are not limited to, those examples of linear or branched alkyl groups recited previously herein, which have at least two carbon atoms and at least one alkyne (or alkynyl) group, such as, but not limited to, ethynyl, linear or branched propynyl, linear or branched butynyl, linear or branched pentynyl, linear or branched hexynyl, etc.

As used herein, the term "haloaliphatic" and related terms, such as "haloaliphatic group(s)", means non-cyclic and non-aromatic hydrocarbon groups, which include at least one carbon atom, such as 1 to 20 carbon atoms, such as $C_1$-$C_{20}$ haloaliphatic groups, or $C_1$-$C_{10}$ haloaliphatic groups, or $C_1$-$C_6$ haloaliphatic groups; include at least one halo group selected from fluoro (F), chloro (Cl), bromo (Br), and/or iodo (I); are linear or branched; optionally include one or more interior and/or terminal alkene groups; and optionally include one or more interior and/or terminal alkyne groups. When including two or more alkene groups, the alkene groups of an haloaliphatic group can be conjugated and/or non-conjugated. When including two or more alkyne groups, the alkyne groups of an haloaliphatic group can be conjugated and/or non-conjugated. When including at least one alkene group and at least one alkyne group, the alkene and alkyne groups of the haloaliphatic group can be conjugated and/or non-conjugated relative to each other. At least one available hydrogen of, and up to all available hydrogens of, a haloaliphatic group can be replaced with a halo group, such as selected from fluoro (F), chloro (Cl), bromo (Br), and/or iodo (I). Correspondingly, as used herein, the term "haloaliphatic" includes, but is not limited to, "perhaloaliphatic" and related terms, such as "perhaloaliphatic group(s)".

Examples of haloaliphatic groups include, but are not limited to, haloalkyl groups. As used herein, the term "haloalkyl" and related terms, such as "haloalkyl group(s)", means groups which include at least one carbon atom, such as 1 to 20 carbon atoms, such as $C_1$-$C_{20}$ haloalkyl, or $C_1$-$C_{10}$ haloalkyl, or $C_1$-$C_6$ haloalkyl; are linear or branched; include at least one halo group, such as selected from fluoro (F), chloro (Cl), bromo (Br), and/or iodo (I); and are saturated (and correspondingly are free of alkene groups and alkyne groups). At least one available hydrogen of, and up to all available hydrogens of, a haloalkyl group can be replaced with a halo group, such as selected from fluoro (F), chloro (Cl), bromo (Br), and/or iodo (I). Correspondingly, as used herein, the term "haloalkyl" includes, but is not limited to, "perhaloalkyl" and related terms, such as "perhaloalkyl group(s)". Examples of haloalkyl groups include, but are not limited to, those examples of linear or branched alkyl groups recited above, which include at least one halo group, such as, but not limited to, halomethyl, haloethyl, linear or branched halopropyl, linear or branched halobutyl, linear or branched halopentyl, linear or branched halohexyl, etc., each independently including at least one halo group.

Examples of haloaliphatic groups include, but are not limited to, haloalkenyl groups. As used herein, the term "haloalkenyl" and related terms, such as "haloalkenyl group(s)", means groups which include at least two carbon atoms, such as 2 to 20 carbon atoms, such as $C_2$-$C_{20}$ haloalkenyl, or $C_2$-$C_{10}$ haloalkenyl, or $C_2$-$C_6$ haloalkenyl; are linear or branched; include at least one halo group, such as selected from fluoro (F), chloro (Cl), bromo (Br), and/or iodo (I); and include one or more interior and/or terminal alkene (or alkenyl) groups. Examples of haloalkenyl groups include, but are not limited to, those examples of linear or branched alkyl groups recited above, which have at least two carbon atoms, at least one alkene (or alkenyl) group, and at least one halo group, such as, but not limited to, haloethenyl, linear or branched halopropenyl, linear or branched halobutenyl, linear or branched halopentenyl, linear or branched halohexenyl, etc., each independently including at least one halo group.

Examples of haloaliphatic groups include, but are not limited to, haloalkynyl groups. As used herein, the term "haloalkynyl" and related terms, such as "haloalkynyl group(s)", means groups which include at least two carbon atoms, such as 2 to 20 carbon atoms, such as $C_2$-$C_{20}$ haloalkynyl, or $C_2$-$C_{10}$ haloalkynyl, or $C_2$-$C_6$ haloalkynyl; are linear or branched; include at least one halo group (or halogen group), such as selected from fluoro (F), chloro (CI), bromo (Br), and/or iodo (I); and include one or more interior and/or terminal alkyne (or alkynyl) groups. Examples of haloalkynyl groups include, but are not limited to, those examples of linear or branched alkyl groups recited above, which have at least two carbon atoms, at least one alkyne (or alkynyl) group, and at least one halo group, such as, but not limited to, haloethynyl, linear or branched halopropynyl, linear or branched halobutynyl, linear or branched halopentynyl, linear or branched halohexynyl, etc., each independently including at least one halo group.

As used herein, the term "cycloaliphatic" and related terms, such as "cycloaliphatic group(s)", means cyclic and non-aromatic hydrocarbon groups, which include at least three carbon atoms, such as 3 to 20 carbon atoms, such as $C_3$-$C_{20}$ cycloaliphatic groups, or $C_3$-$C_{10}$ cycloaliphatic groups, or $C_3$-$C_8$ cycloaliphatic groups; optionally include at least one unsaturated group selected from alkene and/or alkyne; and optionally include two or more fused cycloaliphatic rings.

Examples of cycloaliphatic groups include, but are not limited to, cycloalkyl groups. As used herein, the term "cycloalkyl" and related terms, such as "cycloalkyl group(s)", means groups which include at least three carbon atoms, such as 3 to 20 carbon atoms, such as $C_3$-$C_{20}$ cycloalkyl groups, or $C_3$-$C_{10}$ cycloalkyl groups, or $C_3$-$C_8$ cycloalkyl groups; optionally include at least one unsaturated group selected from alkene and/or alkyne; and optionally include two or more fused cycloalkyl rings. Examples of cycloalkyl groups include, but are not limited to, cyclopropyl; cyclobutyl; cyclopentyl; cyclohexyl; cycloheptyl; cyclooctyl; cyclononyl; cyclodecyl; cycloundecyl; cyclododecyl; bicyclo[2.2.1]heptanyl; decahydronaphthalenyl; tetradecahydroanthracenyl; tetradecahydrophenanthrenyl; and dodecahydro-1H-phenalenyl.

As used herein, the term "aryl" and related terms, such as "aryl group(s)", means cyclic aromatic hydrocarbon groups, which include at least 5 carbon atoms, such as $C_5$-$C_{20}$ aryl groups, or $C_5$-$C_{14}$ aryl groups; and optionally include at least two fused aromatic rings. Examples of aryl groups include, but are not limited to, phenyl, naphthalenyl, anthracenyl, phenanthrenyl, and $3a^1H$-phenalenyl.

As used herein, the term "heteroaryl" and related terms, such as "heteroaryl group(s)", means cyclic aromatic hydrocarbon groups, which include at least 3 carbon atoms, such as $C_3$-$C_{20}$ heteroaryl groups, or $C_5$-$C_{14}$ heteroaryl groups; at least one heteroatom in the aromatic ring, such as —O—, —N—, and/or —S—; and optionally include at least two fused aromatic rings, at least one of which is a fused heteroaryl ring. Examples of heteroaryl groups include, but are not limited to, pyrazolyl, imidazolyl, triazinyl, furanyl, thiophenyl, pyranyl, pyridinyl, isoquinolinyl, and pyrimidinyl.

As used herein, the term "alkoxy" and related terms, such as "alkoxy group(s)", means an alkoxy group which includes at least one carbon atom, such as 1 to 20 carbon atoms, such as $C_1$-$C_{20}$ alkoxy, or $C_1$-$C_{10}$ alkoxy, or $C_1$-$C_6$ alkoxy; includes a terminal divalent oxygen linkage or group (or terminal ether linkage or group); is saturated (and correspondingly is free of alkene groups and alkyne groups). Examples of alkoxy groups include, but are not limited to, those examples of alkyl groups recited previously herein, which include a terminal divalent oxygen linkage or group (or terminal ether linkage or group), such as, but not limited to, methoxy ($CH_3$-O-), ethoxy ($CH_3CH_2$-O-), n-propoxy ($CH_3CH_2CH_2$-O-), iso-propoxy, linear or branched butoxy, linear or branched pentoxy, linear or branched hexoxy, etc.

As used herein, the term "halogen" and related terms, such as "halogen group(s)" and/or "halo group(s)", means a single bonded halogen atom, such as selected from fluoro (F), chloro (Cl), bromo (Br), and/or iodo (I).

As used herein, and unless otherwise explicitly stated, the term "hydrogen" and related terms, such as "hydrogen group(s)", means a single bonded hydrogen (—H).

The photochromic articles of the present invention include a photochromic layer residing over at least a portion of the substrate, in which the photochromic layer is formed from a curable photochromic composition. The curable composition includes a polyol component, in which the polyol component includes a polycarbonate diol having a hydroxyl equivalent weight of at least 1300.

The hydroxyl equivalent weight of the polycarbonate diol is determined in accordance with art-recognized methods, which typically involve subjecting the polycarbonate diol to acetylation, followed by titration with potassium hydroxide, and the mathematical conversion of the resulting hydroxyl number to hydroxyl equivalent weight.

With some embodiments, the polycarbonate diol, of the polyol component, has a hydroxyl equivalent weight of at least 1400. With some further embodiments, the polycarbonate diol, of the polyol component, has a hydroxyl equivalent weight of less than or equal to 1800. The polycarbonate diol, of the polyol component, with some embodiments, has a hydroxyl equivalent weight of from 1300 to 1800, or from 1400 to 1800, or from 1500 to 1800, or from 1300 to 1700, or from 1400 to 1700, or from 1500 to 1700.

The polycarbonate diol, with some embodiments, has a number average molecular weight (Mn) of from 3500 to 6000, or from 4000 to 5500. The polycarbonate diol, with some embodiments, has a weight average molecular weight (Mw) of from 8000 to 11,000, or from 9000 to 10,500. The polycarbonate diol, with some further embodiments, has a polydispersity index (PDI) of less than 3.0, or less than 2.5, or from 1.7 to 3.0, or from 1.8 to 2.5, or from 1.9 to 2.25.

The polycarbonate diol of the polyol component of the curable photochromic composition of the present invention can be prepared in accordance with art-recognized methods. With some embodiments, and for purposes of non-limiting illustration, the polycarbonate diol can be prepared from the reaction of a diol with a carbonyl dihalide, such as carbonyl dichloride, with removal of the resulting halide acid, such as HCl. For purposes of further non-limiting illustration, the polycarbonate diol can be prepared from a transesterification reaction of a diol and a dihydrocarbyl carbonate, such as diphenyl carbonate, with removal of the resulting hydroxyl functional hydrocarbyl, such as phenol.

Examples of diols (having two hydroxyl groups) from which the polycarbonate diol can be prepared, include, but are not limited to, ethane diol (such as 1,2-ethane diol); propane diol (such as 1,2- and/or 1,3-propane diol); butane diol (such as 1,2-, 1,3- and/or 1,4-butanediol); pentane diol (such as, but not limited to, 1,5-pentane diol); heptanediol; hexanediol; octanediol; 4,4'-(propane-2,2-diyl)dicyclohexanol; 4,4'-methylenedicyclohexanol; neopentyl glycol; 2,2,3-trimethylpentane-1,3-diol; 2,2,4-trimethylpentane-1,3-diol; 1,4-dimethylolcyclohexane; 4,4'-(propane-2,2-diyl)diphenol; 4,4'-methylenediphenol; and combinations of two or more such diols.

The polyol component, with some embodiments, further includes (in addition to the polycarbonate diol) a poly(meth)acrylate having at least two hydroxyl groups. The hydroxyl functional poly(meth)acrylate is prepared, with some embodiments, from one or more (meth)acrylate monomers having at least one hydroxyl group; and optionally one or more (meth)acrylate monomers that are free of active hydrogen groups (such as hydroxyl, thiol, primary amine, and secondary amine groups). With some further embodiments, the hydroxyl functional poly(meth)acrylate is prepared from a combination of one or more (meth)acrylate monomers having at least one hydroxyl group; and one or more (meth)acrylate monomers that are free of active hydrogen groups (such as hydroxyl, thiol, primary amine, and secondary amine groups).

The (meth)acrylate monomers including at least one hydroxyl group, from which the hydroxyl functional poly (meth)acrylate is prepared, with some embodiments, include $C_1$-$C_{20}$ (meth)acrylate monomers having at least one hydroxyl group. The $C_1$-$C_{20}$ groups of the hydroxyl functional (meth)acrylate monomers can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, or $C_{10}$-$C_{20}$ fused ring aryl.

Examples of (meth)acrylate monomers having at least one hydroxyl group, from which hydroxyl functional poly(meth) acrylate can be prepared include, but are not limited to, 2-hydroxyethyl (meth)acrylate; hydroxypropyl (meth)acrylate; hydroxycyclohexyl (meth)acrylate; 6-hydroxyhexyl (meth)acrylate; 12-hydroxydodecyl (meth)acrylate; and combinations of two or more thereof.

The (meth)acrylate monomers that are free of active hydrogen groups, from which the hydroxyl functional poly(meth)acrylate is prepared, with some embodiments, include $C_1$-$C_{20}$ (meth)acrylate monomers that are free of active hydrogen groups. The $C_1$-$C_{20}$ groups of the (meth)acrylate monomers that are free of active hydrogen groups can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, or $C_{10}$-$C_{20}$ fused ring aryl.

Examples of (meth)acrylate monomers that are free of active hydrogen functional groups (such as hydroxyl, thiol, primary amine, and secondary amine groups) from which hydroxyl functional poly(meth)acrylate can be prepared include, but are not limited to, methyl (meth)acrylate; ethyl (meth)acrylate; propyl (meth)acrylate; isopropyl (meth)acrylate; butyl (meth)acrylate; isobutyl (meth)acrylate; tert-butyl (meth)acrylate; 2-ethylhexyl (meth)acrylate; lauryl (meth)acrylate; isobornyl (meth)acrylate; cyclohexyl (meth)acrylate; 3,3,5-trimethylcyclohexyl (meth)acrylate; and combinations of two or more thereof.

With some embodiments, hydroxyl groups are introduced into the hydroxyl functional poly(meth)acrylate, after its formation. For purposes of non-limiting illustration, the hydroxyl functional poly(meth)acrylate can be prepared from monomers including (meth)acrylate monomers having oxirane functionality. The oxirane functional (meth)acrylate monomer residues or units can be hydrolyzed or reacted with monofunctional alcohols after polymerization to form hydroxyl functional (meth)acrylate monomer residues or units. Examples of oxirane functional (meth)acrylates from which the hydroxyl functional poly(meth)acrylate can be prepared, include, but are not limited to, glycidyl (meth)acrylate; 3,4-epoxycyclohexylmethyl(meth)acrylate; 2-(3,4-epoxycyclohexyl)ethyl (meth)acrylate; and combinations of two or more thereof.

The poly(meth)acrylate having at least two hydroxyl groups can have any suitable hydroxyl equivalent weight. With some embodiments, the poly(meth)acrylate having at least two hydroxyl groups has a hydroxyl equivalent weight of from 150 to 500, or from 150 to 400, or from 150 to 300.

The poly(meth)acrylate having at least two hydroxyl groups, can have any suitable molecular weight. With some embodiments, the hydroxyl functional poly(meth)acrylate has an Mn of at least 2000, such as an Mn of 2000 to 15,000; and an Mw of at least 2000, such as a Mw of from 2000 to 30,000.

When the polyol component of the curable photochromic composition includes a poly(meth)acrylate having at least two hydroxyl groups, the polycarbonate diol is typically present in an amount of at least 80 percent by weight, or least 85 percent, or at least 90 percent by weight, and less than or equal to 99.5 percent by weight, the percent weights in each case being based on the total solids weight of the polyol component.

When the polyol component of the curable photochromic composition includes the poly(meth)acrylate having at least two hydroxyl groups, the poly(meth)acrylate having at least two hydroxyl groups is typically present in an amount of less than or equal to 20 percent by weight, or less or equal to than 15 percent by weight, or less than or equal to 10 percent by weight, and greater than or equal to 0.5 percent by weight, the percent weights in each case being based on the total solids weight of the polyol component.

The polyol component, with some embodiments, is present in the curable photochromic composition in an amount of from 20 to 49 percent by weight, or from 25 to 40 percent by weight, the percent weights in each case being based on the total resin solids weight of the curable photochromic composition.

The curable photochromic composition further includes an isocyanate component. The isocyanate component includes (i) an unblocked polyfunctional isocyanate having at least two unblocked isocyanate groups; (ii) a blocked polyfunctional isocyanate having at least two blocked isocyanate groups; or combinations of (i) the unblocked polyfunctional isocyanate and (ii) the blocked polyfunctional isocyanate. With some further embodiments, the isocyanate component includes (in addition to or alternatively to the unblocked polyfunctional isocyanate and/or the blocked polyfunctional isocyanate) a polyfunctional isocyanate that includes a combination of at least one unblocked isocyanate group; and at least one blocked isocyanate group.

As used herein, the term "unblocked isocyanate group(s)" and related terms, such as "uncapped isocyanate group(s)", means isocyanate groups (—NCO) that are free from blocking or capping groups, and can also be referred to as "free isocyanate group(s)".

As used herein, the term "blocked isocyanate group(s)" and related terms, such as "capped isocyanate group(s)", means isocyanate groups that are blocked or capped with a blocking or capping agent. After exposure to elevated temperature, the capping/blocking agent separates (or deblocks or decaps) from the blocked polyfunctional isocyanate, allowing the free/unblocked isocyanate groups thereof to react and form covalent bonds with the hydroxyl groups of the polyol component; and to form covalent bonds or linkages with other free isocyanate groups (such as isocyanurate, uretdione, biuret, and/or allophanate linkages). After unblocking or decapping from the blocked polyfunctional isocyanate, the blocking/capping agent can volatize out of the composition (prior to the composition becoming vitrified) and/or remain in the composition, such as a plasticizer. With some embodiments, it is desirable that the blocking/capping agent not form bubbles in the composition and/or not overly plasticize the composition after deblocking/decapping.

The blocking/capping groups of the blocked polyfunctional isocyanate can be selected from, with some embodiments, hydroxy functional compounds, 1H-azoles, lactams, ketoximes, and mixtures thereof. Classes of hydroxy functional compounds include, but are not limited to, aliphatic, cycloaliphatic, or aromatic alkyl monoalcohols or phenolics. Specific examples of hydroxy functional compounds useful as blocking/capping agents, include, but are not limited to, lower aliphatic alcohols such as methanol, ethanol, and n-butanol; cycloaliphatic alcohols such as cyclohexanol and tetrahydrofuran; aromatic-alkyl alcohols, such as phenyl carbinol and methylphenyl carbinol; and glycol ethers, such as ethylene glycol butyl ether, diethylene glycol butyl ether, ethylene glycol methyl ether and propylene glycol methyl ether. With some embodiments, the hydroxy functional blocking/capping groups include phenolics, examples of which include, but are not limited to, phenol itself and substituted phenols, such as cresol, nitrophenol and p-hydroxy methylbenzoate.

Examples of 1H-azoles that are useful as blocking/capping groups include, but are not limited to, 1H-imidazole, 1H-pyrazole, 1H-dialkyl pyrazoles (such as 1H-3,5-dimethyl pyrazole and 1H-2,5-dimethyl pyrazole), 1H-1,2,3-triazole, 1H-1,2,3-benzotriazole, 1H-1,2,4-triazole, 1H-5-methyl-1,2,4-triazole, and 1H-3-amino-1,2,4-triazole.

Ketoximes useful as blocking/capping groups include those prepared from aliphatic or cycloaliphatic ketones. Examples of ketoxime capping groups include, but are not limited to, 2-propanone oxime (acetone oxime), 2-butanone oxime (also referred to as methylethyl ketoxime), 2-pentanone oxime, 3-pentanone oxime, 3-methyl-2-butanone oxime, 4-methyl-2-pentanone oxime, 3,3-dimethyl-2-butanone oxime, 2-heptanone oxime, 3-heptanone oxime, 4-heptanone oxime, 5-methyl-3-heptanone oxime, 2,6-dimethyl-4-heptanone oxime, cyclopentanone oxime, cyclohexanone oxime, 3-methylcyclohexanone oxime, 3,3,5-trimethylcyclohexanone oxime, and 3,5,5-trimethyl-2-cyclohexene-5-one oxime.

Examples of lactam capping groups include, but are not limited to, e-caprolactam and 2-pyrolidinone. Other suitable capping groups include morpholine, 3-aminopropyl morpholine, and N-hydroxy phthalimide.

With some embodiments of the present invention, the blocked isocyanate groups of the blocked polyfunctional isocyanate are each independently blocked with a blocking/capping agent selected from the group consisting of methylethyl ketoxime, pyrazole (more particularly, 1H-pyrazole), and dialkyl pyrazole (more particularly, 1H-dialkyl pyrazole).

With some further embodiments: the unblocked polyfunctional isocyanate includes at least one of aliphatic unblocked polyisocyanates, cycloaliphatic unblocked polyisocyanates, aromatic unblocked polyisocyanates, dimers thereof, trimers thereof, or combinations thereof; and the blocked polyfunctional isocyanate includes at least one of aliphatic blocked polyisocyanates, cycloaliphatic blocked polyisocyanates, aromatic blocked polyisocyanates, dimers thereof, trimers thereof, or combinations thereof.

Examples of polyisocyanates, from which the unblocked polyfunctional isocyanates and blocked polyfunctional isocyanates can in each case be independently selected include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; dimers thereof; trimers thereof; and mixtures thereof.

The unblocked polyfunctional isocyanate, with some embodiments, is an aliphatic unblocked polyfunctional isocyanate, and the blocked polyfunctional isocyanate is an aliphatic blocked polyfunctional isocyanate.

With some additional embodiments, the unblocked polyfunctional isocyanate includes at least one linkage selected from the group consisting of isocyanurate, uretdione, biuret, allophanate, and combinations thereof; and the blocked polyfunctional isocyanate includes at least one linkage selected from the group consisting of isocyanurate, uretdione, biuret, allophanate, or combinations thereof.

Examples of aliphatic polyisocyanates from which the unblocked polyfunctional isocyanates and blocked polyfunctional isocyanates can in each case be independently selected include, but are not limited to, ethylene diisocyanate; tetramethylene-1,4-diisocyanate; hexamethylene-1,6-diisocyanate; 2,2,4-trimethyl hexane-1,6-diisocyanate; dodecane-1,12-diisocyanate; dimers thereof; trimers thereof; and mixtures thereof.

The isocyanate component, with some embodiments, is present in the curable photochromic composition in an amount of from 51 to 80 percent by weight, or from 60 to 75 percent by weight, the percent weights in each case being based on the total resin solids weight of the curable photochromic composition.

The photochromic composition has an equivalents ratio of (i) unblocked isocyanate equivalents and blocked isocyanate equivalents of the isocyanate component to (ii) hydroxyl equivalents of the polyol component, that is at least 5:1.

With some further embodiments, photochromic composition has an equivalents ratio of (i) unblocked isocyanate equivalents and blocked isocyanate equivalents of the isocyanate component to (ii) hydroxyl equivalents of the polyol component, that is at least 6:1.

The photochromic composition has, with some additional embodiments, an equivalents ratio of (i) unblocked isocyanate equivalents and blocked isocyanate equivalents of the isocyanate component to (ii) hydroxyl equivalents of the polyol component, that is less than or equal to 10:1.

The equivalents ratio of (i) unblocked isocyanate equivalents and blocked isocyanate equivalents of the isocyanate component to (ii) hydroxyl equivalents of the polyol component, with some embodiments can range: from 5:1 to 10:1; or from 6:1 to 10:1; or from 6.5:1 to 9:1.

The curable photochromic compositions from which the photochromic layer is prepared further includes at least one photochromic compound. Each photochromic compound, with some embodiments, is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and/or combinations thereof.

Each photochromic compound of the curable photochromic compositions is, with some further embodiments, selected from indeno-fused naphthopyrans having an indeno[2',3':3,4]naphtho[1,2-b]pyran core structure. As used herein, the term "indeno[2',3':3,4]naphtho[1,2-b]pyran core structure" means a core structure represented by the following Formula (III).

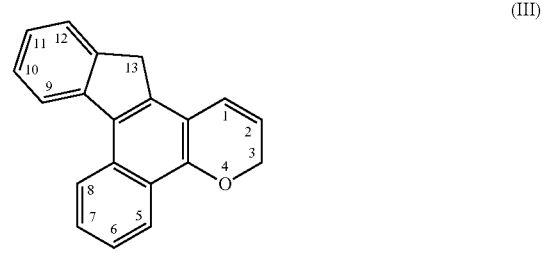 [SMILES: C1=Cc2c3c(c4ccccc4c2OC1)-c1ccccc1C3]

(III)

The term "Ring Position", as used herein with regard to the indeno[2',3':3,4]naphtho[1,2-b]pyran core structure, means and refers to the Ring Positions as enumerated in Formula (III).

The indeno[2',3':3,4]naphtho[1,2-b]pyran core structure includes, with some embodiments, bonded to Position-3, B and B', in which B and B' are each independently selected from unsubstituted aryl or substituted aryl, in which the aryl substituents are each independently selected from halo, heterocycloaliphatic groups, heteroaryl groups, or aliphatic ether groups. With some further embodiments, B and B' (bonded to Position-3 of the indeno[2',3':3,4]naphtho[1,2-b]pyran core structure) are each independently selected from unsubstituted phenyl or substituted phenyl, in which the phenyl substituents each independently selected from fluoro, morpholino, pyrimidino, piperidino, —$OR^d$, in which $R^d$ is selected from linear or branched $C_1$-$C_{10}$ alkyl, and combinations thereof.

In accordance with some further embodiments, the indeno[2',3':3,4]naphtho[1,2-b]pyran core structure includes, bonded to Position-6, hydrogen, or —$OR^a$, in which $R^a$ is linear or branched $C_1$-$C_{10}$ alkyl.

The indeno[2',3':3,4]naphtho[1,2-b]pyran core structure further includes, with some embodiments, bonded to Position-7, an electron-donating group. The electron-donating group can, with some embodiments, be characterized with regard to Hammett Sigma ($\sigma_p$) values, which can be categorized as strong, medium, and weak electron-donating groups. Strong electron-donating groups, which can be bonded to Position-7, have a Hammett Sigma value of less than −0.5, with examples thereof including, but are not limited to, amino; monoalkylamino; dialkylamino; morpholino; and piperidino. Medium electron-donating groups, which can be bonded to Position-7, have a Hammett Sigma value of from −0.49 to −0.20, with examples thereof including, but not limited to, methoxy; ethoxy; and p-aminophenyl. Weak electron-donating groups, which can be bonded to Position-7, have a Hammett Sigma value of from −0.01 to −0.19, with examples thereof including, but not limited to, methyl, ethyl, phenyl, naphthyl, and tolyl.

In accordance with some embodiments, the electron-donating group bonded to Position-7 of the indeno[2',3':3,4]naphtho[1,2-b]pyran core structure is selected from alkyl, alkoxy, primary amino, secondary amino, tertiary amino, or aliphatic cyclic amino.

The indeno[2',3':3,4]naphtho[1,2-b]pyran core structure further includes, with some embodiments, bonded to Position-11, a group selected from (i) an electron-withdrawing, nonconjugating group; or (ii) a pi-conjugation extending group, wherein the pi-conjugation extending group extends the pi-conjugation system of the indeno-fused naphthopyran.

The electron-withdrawing, nonconjugating group bonded to Position-11 of the indeno[2',3':3,4]naphtho[1,2-b]pyran core structure can, with some embodiments, be selected from a halo group (e.g., F, Cl, Br, or I), an α-haloalkyl, α,α-dihaloalkyl, trihalomethyl group, a perhalo($C_2$-$C_{10}$)alkyl group, a perhaloalkoxy group, or the group —O—C(O)—R, in which R is a linear or branched group chosen from $C_1$-$C_{10}$ alkyl, $C_1$-$C_{10}$ haloalkyl, or $C_1$-$C_{10}$ perhaloalkyl, in which each halo group is independently selected from F, Cl, Br, and I. With some embodiments, each halo group, of the electron-withdrawing, nonconjugating group bonded to Position-11 of the indeno[2',3':3,4]naphtho[1,2-b]pyran core structure, is F (or fluoro).

As used herein, the term or phrase "pi-conjugation extending group that extends the pi-conjugated system of the indeno-fused naphthopyran" means a group having at least one pi-bond (π-bond) in conjugation with the pi-conjugated system of the indeno-fused naphthopyran. It will be appreciated by those skilled in the art that in such system, the pi-electrons in the pi-conjugated system of the indeno-fused naphthopyran can be de-localized over the pi-system of the indeno-fused naphthopyran and the group having at least one pi-bond in conjugation with the pi-conjugated system of the indeno-fused naphthopyran. Conjugated bond systems can be represented by an arrangement of at least two double or triple bonds separated by one single bond, that is a system containing alternating double (or triple) bonds and single bonds, wherein the system contains at least two double (or triple) bonds. Non-limiting examples of groups that can extend the pi-conjugated system of the indeno-fused naphthopyran according to various non-limiting embodiments disclosed herein are set forth below in detail.

The pi-conjugation extending group bonded to Position-11 of the indeno[2',3':3,4]naphtho[1,2-b]pyran core structure can, with some embodiments, be selected from the following Formula (I) or Formula (II):

$$-X=Y \quad\quad (I)$$

or

$$-X'\equiv Y' \quad\quad (II),$$

With reference to Formula (I), X is —$CR^1$, where $R^1$ is selected from hydrogen, $C_1$-$C_{20}$ alkyl, $C_2$-$C_{20}$ alkenyl, amino, dialkyl amino, diaryl amino, hydroxy, and alkoxy; and Y is selected from $C(R^2)_2$ and O, where $R^2$ is selected from hydrogen, $C_1$-$C_{20}$ alkyl, $C_2$-$C_{20}$ alkenyl, amino, dialkyl amino, diaryl amino, hydroxy, and alkoxy.

With reference to Formula (II), X' is —C; and Y' is $CR^3$ or N, where $R^3$ is selected from hydrogen, $C_1$-$C_{20}$ alkyl, $C_2$-$C_{20}$ alkenyl, amino, dialkyl amino, diaryl amino, hydroxy, and alkoxy.

With some additional embodiments, the pi-conjugation extending group bonded to Position-11 of the indeno[2',3':3,4]naphtho[1,2-b]pyran core structure is selected from a substituted or unsubstituted aryl; or a substituted or unsubstituted heteroaryl. The aryl and heteroaryl substituents are each independently selected from alkyl and halogen, with some embodiments.

The pi-conjugation extending group bonded to Position-11 of the indeno[2',3':3,4]naphtho[1,2-b]pyran core structure is, with some embodiments, cyano (—CN), such as when with reference to Formula (II) above, X' is —C, and Y' is N.

The indeno[2',3':3,4]naphtho[1,2-b]pyran core structure further includes, with some embodiments, bonded to Position-13: $R^b$ and $R^c$, where $R^b$ and $R^c$ are each independently selected from linear or branched $C_2$-$C_{10}$ alkyl; or $R^b$ and $R^c$ together form a $C_3$-$C_{12}$ spiro group.

Classes and examples of photochromic compounds, such as indeno-fused naphthopyrans having an indeno[2',3':3,4]naphtho[1,2-b]pyran core structure, from which the photochromic compound(s) of the curable photochromic composition can be selected, include, but are not limited to, those disclosed in U.S. Pat. No. 8,388,872 B2 at column 2, line 30 through column 18, line 4, and column 28, line 41 through column 31, line 30; and U.S. Pat. No. 8,748,634 B2 at column 2, line 55 through column 26, line 63, and column 36, line 5 through column 45, line 20, the specific disclosures of which are incorporated herein by reference.

Examples of photochromic compounds that can be included in the curable photochromic composition from which the photochromic layer of the photochromic articles of the present invention are prepared include, but are not limited to, with some embodiments: 3-(4-butoxyphenyl)-3-(4-methoxyphenyl)-7-methoxy-11-(2,4-dimethoxyphenyl)-

13,13-di-n-propyl-3H,13H-indeno[2',3':3,4]naphtho[1,2-b]pyran; 3-(4-butoxyphenyl)-3-(4-morpholinophenyl)-6,7-dimethoxy-11-(4-isopropoxyphenyl)-13,13-di-n-propyl-3H,13H-indeno[2',3':3,4]naphtho[1,2-b]pyran; 3-(4-methoxyphenyl)-3-(4-morpholinophenyl)-6-methoxy-7-piperdino-11-(2-trifluoromethylphenyl)-13,13-di-n-propyl-3H,13H-indeno[2',3':3,4]naphtho[1,2-b]pyran; 3,3-bis-(4-methoxyphenyl)-6-methoxy-7-morpholino-11-morpholino carbonyl-13,13-di-n-propyl-3H,13H-indeno[2',3':3,4]naphtho[1,2-b]pyran; 3-(4-fluorophenyl)-3-(4-morpholinophenyl)-7-methoxy-11-(4-trifluoromethylphenyl)-13,13-di-n-propyl-3H,13H-indeno[2',3':3,4]naphtho[1,2-b]pyran; 3-(4-butoxyphenyl)-3-(4-methoxyphenyl)-6,7-dimethoxy-11-(4-trifluoromethylphenyl)-13,13-di-n-propyl-3H,13H-indeno[2',3':3,4]naphtho[1,2-b]pyran; 3-(3-fluoro-4-methoxyphenyl)-3-(4-morpholinophenyl)-7-methoxy-11-phenyl-13,13-di-n-propyl-3H,13H-indeno[2',3':3,4]naphtho[1,2-b]pyran; 3,3-bis-(4-butoxyphenyl)-6-methoxy-7-piperdino-11-trifluoromethyl-13,13-di-n-propyl-3H,13H-indeno[2',3':3,4]naphtho[1,2-b]pyran; 3-(4-methoxyphenyl)-3-phenyl-7-methoxy-11-cyano-13,13-diethyl-3H,13H-indeno[2',3':3,4]naphtho[1,2-b]pyran; 3,3-bis-(4-methoxyphenyl)-6,7-dimethoxy-11-methoxycarbonyl-13,13-diethyl-3H,13H-indeno[2',3':3,4]naphtho[1,2-b]pyran; 3-(4-fluorophenyl)-3-(4-dimethylaminophenyl)-7-methoxy-11-phenyl-13,13-di-n-propyl-3H,13H-indeno[2',3':3,4]naphtho[1,2-b]pyran; 3-(4-butoxyphenyl)-3-(4-morpholinophenyl)-6,7-dimethoxy-11-(4-methoxyphenyl)-13,13-di-n-propyl-3H,13H-indeno[2',3':3,4]naphtho[1,2-b]pyran; 3,3-bis-(4-methoxyphenyl)-6-methoxy-7-piperidino-11-trifluoromethyl-13,13-diethyl-3H,13H-indeno[2',3':3,4]naphtho[1,2-b]pyran; 3-(4-methoxyphenyl)-3-(4-morpholinophenyl)-7-methoxy-11-(3,5-difluorophenyl)-13,13-diethyl-3H,13H-indeno[2',3':3,4]naphtho[1,2-b]pyran; 3-(4-butoxyphenyl)-3-(4-morpholinophenyl)-6,7-dimethoxy-11-(4-isopropoxyphenyl)-13,13-di-n-pentyl-3H,13H-indeno[2',3':3,4]naphtho[1,2-b]pyran; 3,3-bis-(4-methoxyphenyl)-6,7-dimethoxy-11-trifluoromethyl-13,13-di-n-butyl-3H,13H-indeno[2',3':3,4]naphtho[1,2-b]pyran; 3,3-bis-(4-butoxyphenyl)-6,7-dimethoxy-11-(4-trifluoromethylphenyl)-13,13-di-n-propyl-3H,13H-indeno[2',3':3,4]naphtho[1,2-b]pyran; 3-(4-morpholinophenyl)-3-phenyl-7-methoxy-11-(4-trifluoromethylphenyl)-13,13-di-n-propyl-3H,13H-indeno[2',3': 3,4]naphtho[1,2-b]pyran; 3-(4-fluorophenyl)-3-(4-morpholinophenyl)-6,7-methoxy-11-(2-fluoro-4-trifluoromethylphenyl)-13,13-di-n-propyl-3H,13H-indeno[2',3':3,4]naphtho[1,2-b]pyran; 3-(4-butoxyphenyl)-3-(4-methoxyphenyl)-6-methoxy-7-piperidino-11-(4-trifluoromethylphenyl)-13,13-di-n-propyl-3H,13H-indeno[2',3':3,4]naphtho[1,2-b]pyran; and combinations of two or more thereof.

The photochromic compound(s) is present in the curable photochromic composition in an amount at least sufficient to provide the photochromic layer and photochromic article with desired photochromic performance properties. With some embodiments, the photochromic compound(s) is present in the curable photochromic composition in an amount of from 0.001 to 10 percent by weight, or from 0.01 to 5 percent by weight, or from 0.1 to 2.5 percent by weight, based on the total solids weight of curable photochromic composition (including the weight of the photochromic compound(s), and inclusive of the recited values).

The curable photochromic compositions of the present invention can, with some embodiments, optionally contain additives, such as, but not limited to, waxes for flow and wetting; flow control agents, such as poly(2-ethylhexyl) acrylate; antioxidants; ultraviolet (UV) light absorbers; and blue light blocking (or filtering agents). Examples of useful antioxidants and UV light absorbers include, but are not limited to, those available commercially from BASF under the trademarks IRGANOX and TINUVIN. These optional additives, when used, can be present in amounts up to 20 percent by weight, based on total solids weight of the curable photochromic composition (excluding solvent). Classes and examples of blue light blocking (or filtering) agents, which can be used in various embodiments of the present invention, include, but are not limited to, those described in U.S. Pat. No. 9,683,102 B2 and US 2015/0234208 A1, the pertinent portions of which are incorporated herein by reference.

The curable photochromic compositions of the present invention can, with some embodiments, further include one or more fixed-tint dyes. As used herein, the term "fixed-tint dye" and related terms, such as "fixed-colorant", "static colorant", "fixed dye", and "static dye", means dyes that are non-photosensitive materials, which do not physically or chemically respond to electromagnetic radiation with regard to the visually observed color thereof. The term "fixed-tint dye" and related terms as used herein does not include and is distinguishable from photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable photochromic compositions of the present invention for purposes including, but not limited to, providing a photochromic layer and photochromic article having at least a base (or first) color characteristic of the fixed-tint dye, when the photochromic compound is not activated; and optionally a second color characteristic of the combination of the fixed-tint dye and the photochromic compound when activated, such as by exposure to actinic radiation.

The optional fixed-tint dye of the curable photochromic composition, with some embodiments, includes at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The fixed-tint dye can be present in the curable photochromic composition in varying amounts to provide the intended effect in the cured article prepared therefrom. With some embodiments, the fixed-tint dye is present in the curable photochromic composition in an amount of from 0.001 to 15 percent by weight, or from 0.01 to 10 percent by weight, or from 0.1 to 2.5 percent by weight, the percent weights in each case being based on the total solids weight of the curable photochromic composition (including the weight of the fixed-tint dye; and inclusive of the recited values).

The curable photochromic compositions of the present invention can, with some embodiments, include solvents, selected from water, organic solvents, and combinations thereof.

Classes of organic solvents that can be present in the curable photochromic compositions of the present invention include, but are not limited to, alcohols, such as methanol, ethanol, n-propanol, iso-propanol, n-butanol, sec-butyl alcohol, tert-butyl alcohol, iso-butyl alcohol, benzyl alcohol, furfuryl alcohol, and tetrahydrofurfuryl alcohol; ketones or ketoalcohols, such as acetone, methyl ethyl ketone, and diacetone alcohol; ethers, such as dimethyl ether and methyl ethyl ether; cyclic ethers, such as tetrahydrofuran, and dioxane; esters, such as ethyl acetate, 2-butoxyethylacetate, ethyl lactate, ethylene carbonate, and propylene carbonate, in particular 1,2-propanediol cyclic carbonate; hydroxy functional ethers of alkylene glycols, such as butyl 2-hydroxyethyl ether, methyl 2-hydroxypropyl ether, and phenyl 2-hydroxypropyl ether; nitrogen containing cyclic compounds, such as pyrrolidone, N-methyl-2-pyrrolidone, 1-butylpyrrolidin-2-one, and 1,3-dimethyl-2-imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially-available mixture of $C_9$-$C_{10}$ dialkyl- and trialkyl-benzenes, or Aromatic 150 Fluid, which is a commercially-available mixture of $C_9$-$C_{11}$ alkyl benzenes.

Solvent(s) can be present in the curable photochromic compositions of the present invention in an amount of from 5 to 95 percent by weight, or from 15 to 80 percent by weight, or from 30 to 60 percent by weight, in each case based on the total weight of the curable photochromic composition (including the weight of the solvent).

The curable photochromic composition of the present invention optionally includes, with some embodiments, one or more cure catalysts for catalyzing the reaction between the unblocked and/or blocked isocyanate groups of the isocyanate component and the active hydrogen groups of the polyol component; and reactions between the unblocked and/or blocked isocyanate groups of the isocyanate component. Classes of useful catalysts include, but are not limited to, metal compounds, such as, but not limited to, organic tin compounds, organic bismuth compounds, organic zinc compounds, organic zirconium compounds, organic aluminum compounds, organic nickel compounds, organic mercury compounds, and alkali metal compounds; and amine compounds, such as tertiary amine compounds, and quaternary ammonium compounds. Examples of organic tin compounds include, but are not limited to, tin(II) salts of carboxylic acids, such as tin(II) acetate, tin(II) octanoate, tin(II) ethylhexanoate and tin(II) laurate; tin(IV) compounds, such as dibutyltin oxide, dibutyltin dichloride, dibutyltin diacetate, dibutyltin dilaurate, dibutyltin maleate and dioctyltin diacetate. Examples of suitable organic bismuth compounds include, but are not limited to, bismuth carboxylates. Examples of suitable tertiary amine catalysts include, but are not limited to, diazabicyclo[2.2.2]octane and 1,5-diazabicyclo[4,3,0]non-5-ene. Examples of alkali metal compounds include, but are not limited to, alkali metal carboxylates, such as, but not limited to, potassium acetate, and potassium 2-ethylhexanoate. Examples of quaternary ammonium compounds include, but are not limited to, N-hydroxyalkyl quaternary ammonium carboxylates. With some embodiments, the catalyst is selected from tin(II) octanoate, dibutyltin(IV) dilaurate, and/or bismuth 2-ethylhexanoate.

With some embodiments of the present invention, the curable photochromic composition includes a cure catalyst that includes an organic tin compound selected from tin(II) salts of carboxylic acids, tin(IV) compounds, or combinations thereof.

With some further embodiments of the present invention, the curable photochromic composition includes an organic tin compound that is selected from tin(II) acetate, tin(II) octanoate, tin(II) ethylhexanoate, tin(II) laurate, dibutyltin oxide, dibutyltin dichloride, dibutyltin diacetate, dibutyltin dilaurate, dibutyltin maleate, dioctyltin diacetate, or combinations thereof.

The cure catalyst is typically present in an amount of about 0.05 to about 5.0 percent by weight, or about 0.25 to about 2.0 percent by weight, based on the total weight of resin solids of the curable photochromic composition.

The curable photochromic composition of the present invention can be cured by any suitable methods. With some embodiments, the curable photochromic composition is cured at (or under) ambient conditions, such as at room temperature of about 25° C. With some further embodiments, the curable photochromic composition is cured by exposure to elevated temperature (in excess of ambient room temperature). As used herein, by "cured" is meant a three dimensional crosslink network is formed by covalent bond formation, such as between the hydroxyl groups of the polyol component and the unblocked/blocked isocyanate groups of the isocyanate component. When cured at elevated temperature, the curable photochromic composition can be referred to herein as a thermosetting curable photochromic composition. The temperature at which the thermosetting curable photochromic composition of the present invention is cured is variable and depends in part on the amount of time during which curing is conducted. With some embodiments, the curable photochromic composition is cured at an elevated temperature of from 90° C. to 204° C., or from 100° C. to 177° C., or from 110° C. to 140° C., for a period of 20 to 240 minutes. With some embodiments, the applied curable photochromic composition is subjected to an elevated temperature profile that includes at least one intermediate elevated temperature hold (or plateau) and/or at least one reduced heating rate, which allows, with some embodiments, volatile materials, such as deblocked blocking groups of the blocked polyfunctional isocyanate and/or solvents, to escape from the photochromic layer prior to full cure thereof.

The photochromic layer of the photochromic article can be a photochromic film or a photochromic sheet. As used herein, the term "film" means a layer that is not self-supporting, and the term "sheet" means a layer that is self-supporting.

The curable photochromic coating composition can be applied to (or formed over) the substrate in accordance with art-recognized methods, which include, but are not limited to, extrusion methods; spray application methods; curtain coating application methods; draw-down blade (or bar) application methods; dip-coating application methods; spin-coating application methods; jet printing methods (such as inkjet printing methods, where the "ink" is replaced with a curable photochromic composition according to the present invention); in-mold coating or application methods; and combinations thereof.

After application or formation of the curable photochromic composition over at least one surface of the substrate, the applied curable photochromic composition is cured, such as described previously herein. The photochromic layer can be in the form of a single layer or multiple layers. When in the form of multiple layers, each layer of the photochromic layer can be prepared from curable photochromic compositions according to the present invention, having the same or different compositions, such as the same or different photochromic compound(s). The photochromic layer can have any suitable thickness, such as from 10 micrometers to 250 micrometers, or from 15 micrometers to 75 micrometers.

In addition to the photochromic layer, the photochromic article of the present invention can optionally include one or more further art-recognized layers, such as, but not limited to, a primer layer(s); an adhesive layer(s); a protective layer(s) (such as a hard-coat layer); a polarizing layer(s); a birefringent layer(s); an antireflective layer(s); and/or another photochromic layer(s) that is prepared from a composition other than the curable photochromic composition of the present invention. The substrate and each layer of the photochromic articles of the present invention can, with some embodiments, be optionally and independently subjected to one or more surface treatments, prior to the application of a layer or subsequent layer there-over. Examples of such surface treatments include, but are not limited to, plasma treatments, corona treatments, and combinations thereof.

With some embodiments, one or more primer layers are interposed between a surface of the substrate and the photochromic layer. With some further embodiments, one or more adhesive layers are interposed between a surface of the substrate and the photochromic layer. With some additional embodiments, a primer layer resides over a surface of the substrate, and an adhesive layer is interposed between the primer layer and the photochromic layer.

The photochromic articles of the present invention include a substrate. The photochromic article of the present invention can, with some embodiments, be selected from optical articles, ophthalmic articles, display articles, windows, and mirrors. Correspondingly, the substrate of the photochromic article can be selected from optical substrates, ophthalmic substrates, displays, windows, and mirrors. The substrate can be composed of one or more suitable materials, including, but not limited to, organic materials, such as organic polymeric materials; glasses, such as silica-based glasses; metals; ceramic materials; and combinations thereof.

Non-limiting examples of organic materials that can be used to form the substrate of the photochromic articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39® by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX® by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN®; polyesters, such as the material sold under the trademark MYLAR®; poly (ethylene terephthalate); polyvinyl butyral; poly(methyl methacrylate), such as the material sold under the trademark PLEXIGLAS®, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The photochromic performance of the photochromic articles of the present invention can be determined in accordance with art-recognized methods using art-recognized equipment, as described in further detail in the Examples herein.

As used herein, the ΔOD at saturation is after 15 minutes of activation, and as further described in the examples herein. The Fade Half Life (T½) value is the time interval in seconds for the ΔOD of the activated form of the photochromic material in the photochromic layer to reach one half the fifteen-minute ΔOD at 23° C., after removal of the activating light source, as described in further detail in the Examples herein.

Percent transmittance (% T) in the unactivated state is recorded prior to exposure to the activation light source, as described in further detail in the Examples herein. The % T at 23° C. is the steady state level of transmittance reached after 15 minutes of exposure to 6.7 W/m$^2$ and 50Klux irradiance, as described in further detail in the Examples herein. The % Transmission at 23° C. (% T @ 23° C.) is based on CIE Y coordinates at 10° observer using D65 illuminant. The activation source is then shuttered and the sample is permitted to fade in the temperature and humidity controlled sample chamber with regular measurements of the % T until 70% T is achieved, as described in further detail in the Examples herein. Typically, the measurements obtained from a plurality of test specimens (such as 3 to 5 test specimens) are averaged and reported.

The hardness of the photochromic articles of the present invention, which include a cured photochromic layer can be determined in accordance with art-recognized methods. With some embodiments, the hardness of the cured photochromic layer can be determined using a Fischerscope HCV, Model H100SMC apparatus (available from Fischer Technology, Inc.) at a penetration depth of 2 microns after a 100 Newton load for 15 seconds, and with units of (N/mm$^2$).

The photochromic articles of the present invention, with some embodiments, exhibit a $T_{1/2}$ (Fade Half Life) at 23° C. of less than or equal to 70 seconds, or less than or equal to 65 seconds, or less than or equal to 60 seconds.

With some embodiments, the photochromic articles of the present invention, exhibit a Time to 70% Transmission at 23° C. of less than or equal to 7 minutes, or less than or equal to 6 minutes, or less than or equal to 5 minutes.

The curable photochromic compositions of the present invention, with some embodiments, provide photochromic layers (and correspondingly photochromic articles according to the present invention) having or exhibiting ΔOD at 23° C. values (fifteen-minute ΔOD at 23° C. values) of greater than or equal to 0.6, or greater than or equal to 0.7, or greater than or equal to 0.8.

Photochromic compounds having fast fade rates, such as measured with regard to Fade Half Life ($T_{1/2}$) values and/or Time to 70% Transmission values, typically also provide an undesirably low level or amount of darkness (such as measured with regard to % Transmission at full activation).

The curable photochromic compositions of the present invention, with some embodiments, provide photochromic layers (and correspondingly photochromic articles according to the present invention) having or exhibiting a desirable level of darkness, such as % Transmission values at full activation and 23° C. of from 8% to 22%, or from 8% to 18%, or from 8% to 15%, or from 8% to 14%, or from 8% to 10%, inclusive of the recited values. The curable photochromic compositions of the present invention, with some further embodiments, provide photochromic layers (and correspondingly photochromic articles according to the present invention) having or exhibiting a desirable combination of (i) fast fade rates, such as Fade Half Life ($T_{1/2}$) values at 23° C. of less than or equal to 70 seconds (or less than or equal to 65 seconds, or less than or equal to 60 second), and/or Time to 70% Transmission values at 23° C. of less than or equal to 7 minutes (or less than or equal to 6 minutes, or less than or equal to 5 minutes); and (ii) a desirable level of darkness, such as % Transmission values at full activation and 23° C. of from 8% to 22%, or from 8% to 18%, or from 8% to 15%, or from 8% to 14%, or from 8% to 10%, inclusive of the recited values.

The cured photochromic layer of the fully cured photochromic articles of the present invention, with some embodiments, has a Fischer microhardness of at least 19 N/mm$^2$, or at least 22 N/mm$^2$; and less than or equal to 60 N/mm$^2$.

The present invention can be further characterized by one or more of the following non-limiting clauses.

Clause 1: A photochromic article comprising:
(A) a substrate; and
(B) a photochromic layer residing over at least a portion of said substrate, wherein the photochromic layer is formed from a curable photochromic composition comprising:
  (a) a polyol component, wherein the polyol component comprises a polycarbonate diol having a hydroxyl equivalent weight of at least 1300;
  (b) an isocyanate component comprising at least one of an unblocked polyfunctional isocyanate comprising at least two unblocked isocyanate groups, a blocked polyfunctional isocyanate comprising at least two blocked isocyanate groups, or combinations of said unblocked polyfunctional isocyanate and said blocked polyfunctional isocyanate; and
  (c) at least one photochromic compound,
wherein the curable photochromic composition has an equivalents ratio of (i) unblocked isocyanate equivalents and blocked isocyanate equivalents to (ii) hydroxyl equivalents of the polyol component of at least 5:1, and
wherein the photochromic article exhibits a $T_{1/2}$ (Fade Half Life) at 23° C. of less than or equal to 70 seconds.

Clause 2: The photochromic article of clause 1, wherein the photochromic article exhibits a Time to 70% Transmission at 23° C. of less than or equal to 7 minutes.

Clause 3: The photochromic article of clauses 1 or 2, wherein the substrate is an optical substrate.

Clause 4: The photochromic article of any one of clauses 1 to 3, wherein the polycarbonate diol has a hydroxyl equivalent weight of at least 1400.

Clause 5: The photochromic article of any one of clauses 1 to 4, wherein the polycarbonate diol has a hydroxyl equivalent weight of less than or equal to 1800.

Clause 6: The photochromic article of any one of clauses 1 to 5, wherein the equivalents ratio of (i) unblocked isocyanate equivalents and blocked isocyanate equivalents to (ii) hydroxyl equivalents of the polyol component is at least 6:1.

Clause 7: The photochromic article of any one of clauses 1 to 6, wherein the equivalents ratio of (i) unblocked isocyanate equivalents and blocked isocyanate equivalents to (ii) hydroxyl equivalents of the polyol component is less than or equal to 10:1.

Clause 8: The photochromic article of any one of clauses 1 to 7, wherein the polyol component further comprises a poly(meth)acrylate comprising at least two hydroxyl groups.

Clause 9: The photochromic article of any one of clauses 1 to 8, wherein the unblocked polyfunctional isocyanate is an aliphatic unblocked polyfunctional isocyanate; and the blocked polyfunctional isocyanate is an aliphatic blocked polyfunctional isocyanate.

Clause 10: The photochromic article of any one of clauses 1 to 9, wherein the unblocked polyfunctional isocyanate comprises at least one linkage selected from the group consisting of isocyanurate, uretdione, biuret, allophanate, and combinations thereof; and the blocked polyfunctional isocyanate comprises at least one linkage selected from the group consisting of isocyanurate, uretdione, biuret, allophanate, and combinations thereof.

Clause 11: The photochromic article of any one of clauses 1 to 10, wherein at least one photochromic compound is selected from the group consisting of indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations thereof.

Clause 12: The photochromic article of any one of clauses 1 to 11, wherein at least one photochromic compound is selected from indeno-fused naphthopyrans comprising an indeno[2',3':3,4]naphtho[1,2-b]pyran core structure, such as represented by the following Formula (III),

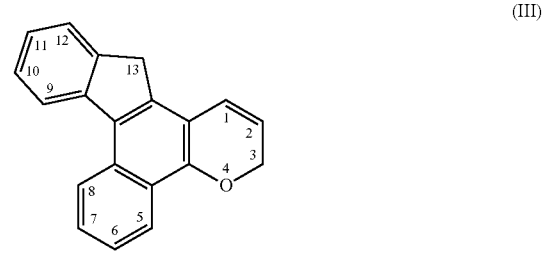 [SMILES: C1=Cc2c3c(c4ccccc4c2OC1)-c1ccccc1C3]

(III)

wherein the indeno[2',3':3,4]naphtho[1,2-b]pyran core structure comprises,
bonded to Position-3, B and B', wherein B and B' are each independently selected from unsubstituted aryl or substituted aryl, wherein the aryl substituents are each independently selected from halo, heterocycloaliphatic groups, heteroaryl groups, or aliphatic ether groups,
bonded to Position-6, hydrogen, or —OR$^a$, wherein R$^a$ is linear or branched $C_1$-$C_{10}$ alkyl,
bonded to Position-7, an electron-donating group,
bonded to Position-11, a group selected from:
(i) an electron-withdrawing, nonconjugating group; or
(ii) a pi-conjugation extending group, wherein said pi-conjugation extending group extends the pi-conjugation system of the indeno-fused naphthopyran; and bonded to Position-13, $R^b$ and $R^c$, wherein $R^b$ and $R^c$ are each independently selected from linear or branched $C_3$-$C_{10}$ alkyl, or $R^b$ and $R^c$ together form a $C_3$-$C_{12}$ spiro group.

Clause 13: The photochromic article of clause 12, wherein B and B', bonded to Position-3, are each independently selected from unsubstituted phenyl or substituted phenyl, the phenyl substituents each independently being selected from the group consisting of fluoro, morpholino, pyrimidino, piperidino, —$OR^d$, wherein $R^d$ is selected from linear or branched $C_1$-$C_{10}$ alkyl, and combinations thereof, the electron-donating group, bonded to Position-7, is selected from alkyl, alkoxy, primary amino, secondary amino, tertiary amino, or aliphatic cyclic amino, the electron-withdrawing, nonconjugating group, that can be bonded to Position-11, is selected from a halo group (e.g., F, Cl, Br, or I), an α-haloalkyl, α,α-dihaloalkyl, trihalomethyl group, a perhalo($C_2$-$C_{10}$)alkyl group, a perhaloalkoxy group, or the group —O—C(O)—R, wherein R is a linear or branched group chosen from $C_1$-$C_{10}$ alkyl, $C_1$-$C_{10}$ haloalkyl, or $C_1$-$C_{10}$ perhaloalkyl, where each halo group is independently selected from F, Cl, Br, and I, and the pi-conjugation extending group, that can be bonded to Position-11, is a group represented by the following Formula (I) or Formula (II),

(I)

or

(II), wherein for Formula (I), X is —$CR^1$, where $R^1$ is selected from hydrogen, $C_1$-$C_{20}$ alkyl, $C_2$-$C_{20}$ alkenyl, amino, dialkyl amino, diaryl amino, hydroxy, or alkoxy; and Y is selected from $C(R^2)_2$ or O, where $R^2$ is selected from hydrogen, $C_1$-$C_{20}$ alkyl, $C_2$-$C_{20}$ alkenyl, amino, dialkyl amino, diaryl amino, hydroxy, or alkoxy;

wherein for Formula (II), X' is —C; and Y' is $CR^3$ or N, where $R^3$ is selected from hydrogen, $C_1$-$C_{20}$ alkyl, $C_2$-$C_{20}$ alkenyl, amino, dialkyl amino, diaryl amino, hydroxy, or alkoxy, or the pi-conjugation extending group, that can be bonded to Position-11, is selected from a substituted or unsubstituted aryl; or a substituted or unsubstituted heteroaryl, where the aryl substituents and heteroaryl substituents are each independently selected from alkyl or halogen.

Clause 14: The photochromic article of any one of clauses 1 to 13, wherein the photochromic compound, of the curable photochromic composition, is selected from:

3-(4-butoxyphenyl)-3-(4-methoxyphenyl)-7-methoxy-11-(2,4-dimethoxyphenyl)-13,13-di-n-propyl-3H,13H-indeno[2',3':3,4]naphtho[1,2-b]pyran;

3-(4-butoxyphenyl)-3-(4-morpholinophenyl)-6,7-dimethoxy-11-(4-isopropoxyphenyl)-13,13-di-n-propyl-3H,13H-indeno[2',3':3,4]naphtho[1,2-b]pyran;

3-(4-methoxyphenyl)-3-(4-morpholinophenyl)-6-methoxy-7-piperdino-11-(2-trifluoromethylphenyl)-13,13-di-n-propyl-3H,13H-indeno[2',3':3,4]naphtho[1,2-b]pyran;

3,3-bis-(4-methoxyphenyl)-6-methoxy-7-morpholino-11-morpholinocarbonyl-13,13-di-n-propyl-3H,13H-indeno[2',3':3,4]naphtho[1,2-b]pyran;

3-(4-fluorophenyl)-3-(4-morpholinophenyl)-7-methoxy-11-(4-trifluoromethylphenyl)-13,13-di-n-propyl-3H,13H-indeno[2',3':3,4]naphtho[1,2-b]pyran;

3-(4-butoxyphenyl)-3-(4-methoxyphenyl)-6,7-dimethoxy-11-(4-trifluoromethylphenyl)-13,13-di-n-propyl-3H,13H-indeno[2',3':3,4]naphtho[1,2-b]pyran;

3-(3-fluoro-4-methoxyphenyl)-3-(4-morpholinophenyl)-7-methoxy-11-phenyl-13,13-di-n-propyl-3H,13H-indeno[2',3':3,4]naphtho[1,2-b]pyran;

3,3-bis-(4-butoxyphenyl)-6-methoxy-7-piperdino-11-trifluoromethyl-13,13-di-n-propyl-3H,13H-indeno[2',3':3,4]naphtho[1,2-b]pyran;

3-(4-methoxyphenyl)-3-phenyl-7-methoxy-11-cyano-13,13-diethyl-3H,13H-indeno[2',3':3,4]naphtho[1,2-b]pyran;

3,3-bis-(4-methoxyphenyl)-6,7-dimethoxy-11-methoxycarbonyl-13,13-diethyl-3H,13H-indeno[2',3':3,4]naphtho[1,2-b]pyran;

3-(4-fluorophenyl)-3-(4-dimethylaminophenyl)-7-methoxy-11-phenyl-13,13-di-n-propyl-3H,13H-indeno[2',3':3,4]naphtho[1,2-b]pyran;

3-(4-butoxyphenyl)-3-(4-morpholinophenyl)-6,7-dimethoxy-11-(4-methoxyphenyl)-13,13-di-n-propyl-3H,13H-indeno[2',3':3,4]naphtho[1,2-b]pyran;

3,3-bis-(4-methoxyphenyl)-6-methoxy-7-piperidino-11-trifluoromethyl-13,13-diethyl-3H,13H-indeno[2',3':3,4]naphtho[1,2-b]pyran;

3-(4-methoxyphenyl)-3-(4-morpholinophenyl)-7-methoxy-11-(3,5-difluorophenyl)-13,13-diethyl-3H,13H-indeno[2',3':3,4]naphtho[1,2-b]pyran;

3-(4-butoxyphenyl)-3-(4-morpholinophenyl)-6,7-dimethoxy-11-(4-isopropoxyphenyl)-13,13-di-n-pentyl-3H,13H-indeno[2',3':3,4]naphtho[1,2-b]pyran;

3,3-bis-(4-methoxyphenyl)-6,7-dimethoxy-11-trifluoromethyl-13,13-di-n-butyl-3H,13H-indeno[2',3':3,4]naphtho[1,2-b]pyran;

3,3-bis-(4-butoxyphenyl)-6,7-dimethoxy-11-(4-trifluoromethylphenyl)-13,13-di-n-propyl-3H,13H-indeno[2',3':3,4]naphtho[1,2-b]pyran;

3-(4-morpholinophenyl)-3-phenyl-7-methoxy-11-(4-trifluoromethylphenyl-13,13-di-n-propyl-3H,13H-indeno[2',3':3,4]naphtho[1,2-b]pyran;

3-(4-fluorophenyl)-3-(4-morpholinophenyl)-6,7-methoxy-11-(2-fluoro-4-trifluoromethylphenyl)-13,13-di-n-propyl-3H,13H-indeno[2',3':3,4]naphtho[1,2-b]pyran;

3-(4-butoxyphenyl)-3-(4-methoxyphenyl)-6-methoxy-7-piperidino-11-(4-trifluoromethylphenyl)-13,13-di-n-propyl-3H,13H-indeno[2',3':3,4]naphtho[1,2-b]pyran;

or combinations of two or more thereof.

Clause 15: The photochromic article of any one of clauses 1 to 14, wherein the curable photochromic composition further comprises a cure catalyst comprising an organic tin compound selected from tin(II) salts of carboxylic acids, tin(IV) compounds, or combinations thereof.

Clause 16: The photochromic article of clause 15, wherein the organic tin compound is selected from tin(II) acetate, tin(II) octanoate, tin(II) ethylhexanoate, tin(II) laurate, dibutyltin oxide, dibutyltin dichloride, dibutyltin diacetate, dibutyltin dilaurate, dibutyltin maleate, dioctyltin diacetate, or combinations thereof.

Clause 17: The photochromic article of any one of clauses 1 to 16, wherein the photochromic article exhibits a % Transmission value at full activation and 23° C. of from 8% to 22%, or from 8% to 18%, or from 8% to 15%, or from 8% to 14%, or from 8% to 10%, inclusive of the recited values.

Clause 18: The photochromic article of any one of clauses 1 to 17, wherein the photochromic article exhibits: (i) a Fade Half Life ($T_{1/2}$) value at 23° C. of less than or equal to 70 seconds (or less than or equal to 65 seconds, or less than or equal to 60 seconds), and/or a Time to 70% Transmission value at 23° C. of less than or equal to 7 minutes (or less than or equal to 6 minutes, or less than or equal to 5 minutes); and (ii) a % Transmission value at full activation and 23° C. of from 8% to 22%, or from 8% to 18%, or from 8% to 15%, or from 8% to 14%, or from 8% to 10%, inclusive of the recited values.

The present invention is more particularly described in the following examples, which are intended to be illustrative only, since numerous modifications and variations therein will be apparent to those skilled in the art. Unless otherwise specified, all parts and all percentages are by weight.

EXAMPLES

In Part 1 of the following examples, the preparation of curable photochromic compositions is described. In Part 2 there is described, the formation of test specimens, which included applying and curing of the curable photochromic compositions over polycarbonate plano lens substrates. In Part 3, the photochromic performance of the test specimens of Part 2 is described.

Part 1

Curable photochromic compositions were prepared from the components listed in Table 1. All components are listed in parts per weight, and quantities in Charge 2 are listed by solid component only.

TABLE 1

|  | Comparative Ex 1 | Ex 2 |
|---|---|---|
| Charge 1 | | |
| 3,3-bis-(4-methoxyphenyl)-6,7-dimethoxy-11-(4-trifluoromethylphenyl)-13,13-dimethyl-3H,13H-indeno[2',3':3,4]naphtho[1,2-b]pyran | 2.25 | — |
| 3-(4-butoxyphenyl)-3-(4-methoxyphenyl)-7-methoxy-11-phenyl-13,13-dimethyl-3H,13H-indeno[2',3':3,4]naphtho[1,2-b]pyran | 0.76 | — |
| 3-(4-butoxyphenyl)-3-(4-morpholinophenyl)-7-methoxy-11-phenyl-13,13-dimethyl-3H,13H-indeno[2',3':3,4]naphtho[1,2-b]pyran | 1.25 | — |
| 3-(4-methoxyphenyl)-3-(4-morpholinophenyl)-6-methoxy-7-piperdino-11-(2-trifluoromethylphenyl)-13,13-dimethyl-3H,13H-indeno[2',3':3,4]naphtho[1,2-b]pyran | 1.21 | — |
| 3-(4-morpholinophenyl)-3-phenyl-11-(4-trifluoromethylphenyl)-13,13-dimethyl-3H,13H-indeno[2',3':3,4]naphtho[1,2-b]pyran | 0.52 | — |
| 3-(4-butoxyphenyl)-3-(4-methoxyphenyl)-6,7-dimethoxy-11-(4-trifluoromethylphenyl)-13,13-di-n-propyl-3H,13H-indeno[2',3':3,4]naphtho[1,2-b]pyran | — | 1.90 |
| 3,3-bis-(4-methoxyphenyl)-6-methoxy-7-morpholino-11-morpholinocarbonyl-13,13-di-n-propyl-3H,13H-indeno[2',3':3,4]naphtho[1,2-b]pyran | — | 0.46 |
| 3-(4-fluorophenyl)-3-(4-morpholinophenyl)-7-methoxy-11-(4-trifluoromethylphenyl)-13,13-di-n-propyl-3H,13H-indeno[2',3':3,4]naphtho[1,2-b]pyran | — | 2.71 |
| TINUVIN ® 144 [1] hindered amine light stabilizer | 2.01 | 1.98 |
| IRGANOX ® 245 [2] antioxidant | 2.01 | 1.98 |
| N-methyl-2-pyrrolidone | 34.03 | 34.27 |
| Charge 2 | | |
| Polycarbonate Polyol B [3] | 31.62 | 31.50 |
| Charge 3 | | |
| K-KAT ® 348 [4] bismuth carboxylate catalyst | 0.75 | 0.77 |
| Gamma-glycidoxypropyl trimethoxysilane | 3.94 | 4.14 |
| Acrylic polyol [5] | 3.40 | 3.40 |
| TRIXENE ® BI-7960 [6] blocked hexamethylene diisocyanate | 65.00 | 65.10 |
| BYK ® 333 [7] polyether modified dimethylpolysiloxane copolymer | 0.08 | 0.07 |
| Solvent from resins [8] | 51.30 | 51.91 |
| % Solids (theory) | 57.40 | 57.00 |

[1] Hindered amine light stabilizer, commercially available from BASF.

[2] Antioxidant commercially available from BASF.

[3] Polycarbonate diol prepared according to the Polycarbonate Polyol B (PP-B) preparation in Part 1 of the Examples section of U.S. Pat. No. 8,608,988 at column 19, lines 47-59, which is incorporated by reference herein. The hydroxyl equivalent weight of the polycarbonate diol was 1810 (based on solids). The final resin was reduced to 60% solids with Dipropylene Glycol Methyl Ether Acetate (DPMA).

[4] K-KAT ® 348 bismuth carboxylate catalyst is commercially available from King Industries, Inc.

[5] Made from free radical polymerization of Hydroxypropyl methacrylate (40.4%), Butyl methacrylate (57.6%) and Acrylic acid (2.0%) with a number average molecular weight (Mn) of 5500 as determined by GPC with polystyrene standard and tetrahydrofuran diluent. Hydroxyl Equivalent weight (on solids) of 360. Material reduced to 61% solids using dipropylene glycol methyl ether acetate.

[6] Blocked hexamethylene diisocyanate available from Baxenden Chemical Co.

[7] A polyether modified dimethylpolysiloxane copolymer, available from BYK-Chemie.

[8] Total solvent from raw materials.

For each curable photochromic composition summarized in Table 1, the components of Charge 1 were added to a suitable vessel with stirring and heated to 40-60° C. until the solids dissolved. Charge 2 was added to the solution of Charge 1 and mixed for a minimum of 30 minutes. To this was added the combined components of Charge 3. The resulting mixture was placed on a WHEATON® 348923-A Benchtop Roller, available from Wheaton Industries, Inc., for a minimum of six hours prior to use. The centi-equivalents (cEq) and resulting NCO to active hydrogen ratios for each Example are summarized in Table 2.

TABLE 2

| Example | cEq polycarbonate diol (OH) | cEq acrylic polyol (OH) | cEq Isocyanate (NCO) | NCO:OH |
|---|---|---|---|---|
| Comparative Ex 1 | 1.75 | 0.94 | 22.65 | 8.4:1.0 |
| Ex 2 | 1.74 | 0.95 | 22.68 | 8.4:1.0 |

Part 2

For each sample (or test specimen) prepared, a PDQ® coated Gentex® polycarbonate plano lens having a diameter of 76 millimeters was treated with oxygen plasma at a flow rate of 100 milliliters (mL) per minute of oxygen at 100 watts of power for three minutes, prior to being coated with the compositions of Comparative Example 1 and Example 2, using a spin coating process. About 1-2 mL of each composition was dispensed onto the substrate and then rotated for eight seconds at a spin speed sufficient to deposit 0.25-0.37 g of wet coating onto the lens.

The coated substrates were then placed in a 40° C. oven until all were accumulated. The coated substrates were then cured in a forced air oven at 125° C. for one hour and subsequently cooled to room temperature. The substrates having a cured photochromic layer there-over were further treated with oxygen plasma as previously described and further coated (over the cured photochromic layer) with a protective coating according to the formulation reported in Table 1 of Example 1 in U.S. Pat. No. 7,410,691, which is incorporated herein by reference, using an additional 0.5% polybutyl acrylate. The protective coating was applied by spin coating, and UV cured in an EyeUV oven equipped with D bulbs. Following this, each coated substrate (further including the protective coating layer) was further cured at 105° C. for three hours. The lenses (test specimens) were then evaluated for photochromic properties.

Part 3

The photochromic performance of each of the aforementioned test specimens was performed as follows. The coated lenses (test specimens) prepared as described above were tested in the Photochromic Performance Test on the Advanced Bench for Measuring Photochromics ("A-BMP") optical bench. The A-BMP optical bench was maintained at a constant temperature of 73.4° F. (23° C.) during testing. Prior to testing on the A-BMP optical bench, each of the coated lenses were exposed to 365-nanometer ultraviolet light for 5 minutes at a distance of 10 centimeters to activate the photochromic materials. The UVA (315 to 380 nm) irradiance at the lens was measured with a Goosch & Housego OL 756 spectroradiometer with OL 86-T cosine receptor and found to be 7.7 watts per square meter. The lenses were then heated up to 70° C., at which time the lenses were maintained at this temperature and exposed F17T8 yellow fluorescent light for 25 minutes at a distance of 10 centimeters to further inactivate the photochromic materials. The irradiance at the lens was measured with the OL 756 and found to be 9Klux. The lenses, were then kept in a dark environment at room temperature (from 70 to 75° F., or 21 to 24° C.) for at least 1 hour prior to testing on the A-BMP optical bench.

The A-BMP optical bench was fitted with two 150-watt Newport Model #66902 Xenon arc lamps at right angles to each other and their associated Newport 69907 Digital Exposure Controllers. The light path from Lamp 1 was directed through a 3 mm SCHOTT KG-2 band-pass filter and appropriate neutral density filters that contributed to the required UV and partial visible light irradiance level. The light path from Lamp 2 was directed through a 3 mm SCHOTT KG-2 band-pass filter, a SCHOTT GG400 short band cutoff filter and appropriate neutral density filters in order to provide supplemental visible light illuminance. A 2 inch×2 inch 50% polka dot beam splitter, at 45° to each lamp is used to mix the two beams. The combination of neutral density filters and voltage control of the Xenon arc lamp were used to adjust the intensity of the irradiance. Proprietary software i.e., PTSoft version 5.3 was used on the A-BMP to control timing, irradiance, air cell and sample temperature, shuttering, filter selection and response measurement. A ZEISS® Model MCS 601 spectrophotometer, with fiber optic cables for light delivery through the lens was used for response and color measurement. Photopic response measurements were collected on each lens.

The power output of the optical bench (i.e., the dosage of light that the lens was exposed to) was adjusted to 6.7 Watts per square meter (W/m$^2$) UVA, integrated from 315-380 nm and 50 Klux illuminance, integrated from 380-780 nm. Measurement of this power set point was made using an irradiance probe and the calibrated Zeiss spectrophotometer. The lens sample cell was fitted with a quartz window and self-centering sample holder. The temperature in the sample cell was controlled through the software with an AirJet XE custom-coupled to a bubbling water bath to deliver 50% RH air maintained at 23° C.+/−0.1 C. Measurement of the sample's dynamic photochromic response and color measurements was made using the same Zeiss spectrophotometer, with fiber optic cables for light delivery from a tungsten halogen lamp and through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was 30° from perpendicular.

Response measurements, in terms of a change in optical density (ΔOD, or delta OD, or Delta Optical density) from the unactivated or bleached state to the activated or colored state were determined by establishing the initial unactivated transmittance, opening the shutter from the Xenon lamps and measuring the transmittance through activation at selected intervals of time. Change in optical density was determined according to the formula:

$$\Delta OD = \log_{10}(\% \, Tb/\% \, Ta)$$

where % Tb is the percent transmittance in the bleached state, and % Ta is the percent transmittance in the activated state. Delta Optical density measurements were based on photopic optical density.

The results are summarized below in Table 3. The % T at 23° C. is the steady state level of transmittance reached after 15 minutes of exposure to the 6.7 W/m² and 50Klux irradiance specified above. The % Transmission at 23° C. (% T @ 23° C.) is based on CIE Y coordinates at 10° observer using D65 illuminant. The activation source is then shuttered and the sample is permitted to fade in the temperature and humidity controlled sample chamber with regular measurements of the % T until the 70% T is achieved. If exactly 70% T is not achieved at a collected data point, this value is extracted by linear interpolation between the nearest measurements and respective time collection intervals by post-processing the data.

TABLE 3

| Example | NCO:OH (OH = 1.0) | % T @ 23° C. | ΔOD @ 23° C. | Time to 70% T (minutes) | T½ @ Photopic (seconds) |
|---|---|---|---|---|---|
| Comparative Ex 1 | 8.4 | 8.8 | 0.99 | 7.0 | 78 |
| Ex 2 | 8.4 | 10.0 | 0.94 | 4.7 | 59 |

The present invention has been described with reference to specific details of particular embodiments thereof. It is not intended that such details be regarded as limitations upon the scope of the invention except insofar as and to the extent that they are included in the accompanying claims.

What is claimed is:

1. A photochromic article comprising:
(A) a substrate; and
(B) a photochromic layer residing over at least a portion of said substrate, wherein said photochromic layer is formed from a curable photochromic composition comprising,
(a) a polyol component, wherein said polyol component comprises a polycarbonate diol having a hydroxyl equivalent weight of at least 1300;
(b) an isocyanate component comprising at least one of an unblocked polyfunctional isocyanate comprising at least two unblocked isocyanate groups, a blocked polyfunctional isocyanate comprising at least two blocked isocyanate groups, or combinations of said unblocked polyfunctional isocyanate and said blocked polyfunctional isocyanate; and
(c) at least one photochromic compound,
wherein said curable photochromic composition has an equivalents ratio of (i) unblocked isocyanate equivalents and blocked isocyanate equivalents to (ii) hydroxyl equivalents of said polyol component of at least 5:1, and
wherein said photochromic article exhibits a $T_{1/2}$ (Fade Half Life) at 23° C. of less than or equal to 60 seconds,
wherein at least one photochromic compound is selected from indeno-fused naphthopyrans comprising an indeno [2',3': 3,4] naphtho [1,2-b] pyran core structure represented by the following Formula (III),

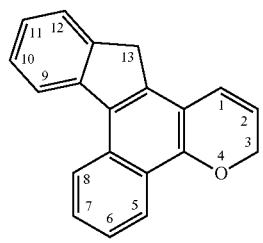

wherein said indeno [2',3': 3,4] naphtho [1,2-b] pyran core structure comprises,
bonded to Position-3, B and B', wherein B and B' are each independently selected from the group consisting of unsubstitued phenyl, and substituted phenyl, wherein the phenyl substituents are each independently selected from the group consisting of fluoro, morpholino, pyrimidino, piperidino, and -OR$^d$, wherein R$^d$ is selected from linear and branched $C_1$-$C_{10}$ alkyl,
bonded to Position-6, hydrogen, or -OR$^a$, wherein R$^a$ is linear or branched $C_1$-$C_{10}$ alkyl,
bonded to Position-7, an electron-donating group selected from the group consisting of alkoxy, morpholino, and piperidino,
bonded to Position-11, a group selected from the group consisting of phenyl, fluoro substituted phenyl, perfluroalkyl substituted phenyl, morpholinocarbonyl, and piperidinocarbonyl;
bonded to Position-13, R$^b$ and R$^c$, wherein R$^b$ and R$^c$ are each independently selected from linear or branched $C_3$-$C_{10}$ alkyl; and
hydrogen is bonded to each of Positions 1, 2, 5, 8, 9, 10, and 12.

2. The photochromic article of claim 1, wherein said photochromic article exhibits a Time to 70% Transmission at 23° C. of less than or equal to 7 minutes.

3. The photochromic article of claim 1, wherein said substrate is an optical substrate.

4. The photochromic article of claim 1, wherein said polycarbonate diol has a hydroxyl equivalent weight of at least 1400.

5. The photochromic article of claim 1, wherein said polycarbonate diol has a hydroxyl equivalent weight of less than or equal to 1800.

6. The photochromic article of claim 1, wherein said equivalents ratio of (i) unblocked isocyanate equivalents and blocked isocyanate equivalents to (ii) hydroxyl equivalents of said polyol component is at least 6:1.

7. The photochromic article of claim 1, wherein said equivalents ratio of (i) unblocked isocyanate equivalents and blocked isocyanate equivalents to (ii) hydroxyl equivalents of said polyol component is less than or equal to 10:1.

8. The photochromic article of claim 1, wherein said polyol component further comprises a poly(meth)acrylate comprising at least two hydroxyl groups.

9. The photochromic article of claim 1, wherein
said unblocked polyfunctional isocyanate is an aliphatic unblocked polyfunctional isocyanate, and
said blocked polyfunctional isocyanate is an aliphatic blocked polyfunctional isocyanate.

10. The photochromic article of claim 1, wherein
said unblocked polyfunctional isocyanate comprises at least one linkage selected from the group consisting of isocyanurate, uretdione, biuret, allophanate, and combinations thereof, and said blocked polyfunctional isocyanate comprises at least one linkage selected from the group consisting of isocyanurate, uretdione, biuret, allophanate, and combinations thereof.

11. The photochromic article of claim 1, wherein said curable photochromic composition further comprises a cure catalyst comprising an organic tin compound selected from the group consisting of tin (II) salts of carboxylic acids, tin (IV) compounds, and combinations thereof.

12. The photochromic article of claim 11, wherein said organic tin compound is selected from the group consisting of tin (II) acetate, tin (II) octanoate, tin (II) ethylhexanoate, tin (II) laurate, dibutyltin oxide, dibutyltin dichloride, dibutyltin diacetate, dibutyltin dilaurate, dibutyltin maleate, dioctyltin diacetate, or and combinations thereof.

13. The photochromic article of claim 1, wherein $R^b$ and $R^c$ are each independently selected from linear or branched $C_3$ alkyl.

* * * * *

UNITED STATES PATENT AND TRADEMARK OFFICE
CERTIFICATE OF CORRECTION

Page 1 of 1

PATENT NO. : 12,304,991 B2
APPLICATION NO. : 17/292055
DATED : May 20, 2025
INVENTOR(S) : Joseph D. Turpen et al.

It is certified that error appears in the above-identified patent and that said Letters Patent is hereby corrected as shown below:

In the Claims

Column 29, Line 66, Claim 1, delete "indeno [2',3': 3,4] naphtha [1,2-b] pyran" and insert -- indeno[2',3':3,4]naphtha[1,2-b]pyran --

Column 30, Line 13, Claim 1, delete "indeno [2',3': 3,4] naphtha [1,2-b] pyran" and insert -- indeno[2',3':3,4]naphtha[1,2-b]pyran --

Column 31, Line 8, Claim 11, delete "tin (II)" and insert -- tin(II) --

Column 31, Lines 8-9, Claim 11, delete "tin (IV)" and insert -- tin(IV) --

Column 31, Line 12, Claim 12, delete "tin (II)" and insert -- tin(II) --

Column 31, Line 12, Claim 12, delete "tin (II)" and insert -- tin(II) --

Column 31, Line 12, Claim 12, delete "tin (II)" and insert -- tin(II) --

Column 31, Line 13, Claim 12, delete "tin (II)" and insert -- tin(II) --

Signed and Sealed this
Twenty-ninth Day of July, 2025

Coke Morgan Stewart
*Acting Director of the United States Patent and Trademark Office*